(12) United States Patent
Sim et al.

(10) Patent No.: US 8,611,841 B2
(45) Date of Patent: Dec. 17, 2013

(54) APPARATUS FOR ENHANCED MESSAGING AND A METHOD FOR ENHANCED MESSAGING

(75) Inventors: Wong Hoo Sim, Singapore (SG); Seh Eing Lim, Singapore (SG)

(73) Assignee: Creative Technology Ltd, Singapore (SG)

( * ) Notice: Subject to any disclaimer, the term of this patent is extended or adjusted under 35 U.S.C. 154(b) by 424 days.

(21) Appl. No.: 12/989,788

(22) PCT Filed: Apr. 22, 2009

(86) PCT No.: PCT/SG2009/000146
§ 371 (c)(1),
(2), (4) Date: Oct. 26, 2010

(87) PCT Pub. No.: WO2009/134210
PCT Pub. Date: Nov. 5, 2009

(65) Prior Publication Data
US 2011/0053621 A1 Mar. 3, 2011

(30) Foreign Application Priority Data
May 2, 2008 (SG) .................................. 200803381

(51) Int. Cl.
*H04B 7/00* (2006.01)

(52) U.S. Cl.
USPC ....................................... 455/246.1; 370/338

(58) Field of Classification Search
USPC ............ 455/466, 563; 348/194, 423.1, 425.4, 348/464; 715/203, 210, 500.1, 513, 716
See application file for complete search history.

(56) References Cited

U.S. PATENT DOCUMENTS

| | | | |
|---|---|---|---|
| 2001/0049715 A1* | 12/2001 | Kidder | 709/203 |
| 2005/0003866 A1* | 1/2005 | Bechon et al. | 455/563 |
| 2007/0245223 A1* | 10/2007 | Siedzik et al. | 715/500.1 |
| 2007/0260972 A1* | 11/2007 | Anderl | 715/513 |

* cited by examiner

*Primary Examiner* — Marcos Batista
(74) *Attorney, Agent, or Firm* — Creative Technology Ltd

(57) ABSTRACT

There is provided a method for communications involving at least one text message. The method includes a sender apparatus transmitting at least one message, the at least one message including message data and at least one video filmlet; transmitting the message data over a first network and the at least one video filmlet to a server on a second network; and a recipient apparatus receiving the at least one message, the at least one message being combined and generated from the message data received from the first network and the at least one video filmlet received from the server. Advantageously, the at least one message may be generated in a manner as composed by a sender of the at least one message. It is preferable that the sender and recipient apparatus are able to support a data sync protocol on the second network.

22 Claims, 3 Drawing Sheets

APPARATUS FOR ENHANCED MESSAGING AND A METHOD FOR ENHANCED MESSAGING

FIELD OF INVENTION

The present invention relates to the field of inter-party communications, particularly in relation to an apparatus and method for communications, particularly enhanced messaging.

BACKGROUND

In the past, common forms of communication included, for example, telephone calls, facsimiles, telexes and the like. There were few alternative forms of communication available in the past. Advances in technology coupled with increases in data transmission rates have significantly increased the types of communication which are readily available.

One of these new types of communication which is readily accessible is texting. Texting may be done on handheld devices which are becoming more ubiquitous by the day. The ready availability and low cost of texting has led to an increase in the popularity of this form of communication. An increasing number of people also prefer texting as a form of communication, as it is convenient and un-intrusive, with a person being able to have the option of when to reply to text messages. Unfortunately, purely text-based messages appear sterile and boring. It is undeniable that the phrase "A picture speaks a thousand words" holds true.

In this regard, it is apparent that appropriate visual icons used in combination with text during text-based communication would enhance a communication experience between communicating parties.

SUMMARY

In a first aspect, there is provided a communications apparatus used for receiving at least one text message. The apparatus includes a first data receiver for receiving message data from a first network; a second data receiver for receiving at least one video filmlet from a server on a second network; a controller for combining the message data and the at least one video filmlet into at least one message for generation on a display, and a platform to support the generation of the at least one message on the display, and to support a data sync protocol on the second network. It is advantageous that the at least one message is generated in a manner as composed by a sender of the at least one message. The communications apparatus may further including data storage for storing the at least one video filmlet from the server.

It is preferable that the first network may be a telecommunications network and the second network may be the internet. The telecommunications network may preferably be of a form such as, for example, GSM, GPRS, CDMA, HSDPA, or EDGE.

The at least one video filmlet may be obtained solely from the data storage when the at least one video filmlet is stored in the data storage. Alternatively, the at least one message may be generated without the at least one video filmlet when the at least one video filmlet is not stored in the data storage and the communications apparatus is not connected to the second network.

The at least one video filmlet may be stored on the server in accordance to sender identity. The at least one video filmlet stored on the server for a particular sender may be received on the communications apparatus when connected to the second network, with the particular sender being a contact in a recipient's contact list. The at least one message may be received in the manner like, for example, the at least one video filmlet incorporated amongst the message data, the at least one video filmlet being a background for the message data or a combination of the aforementioned.

In a second aspect, there is provided a communications apparatus used for transmitting at least one text message. The apparatus includes a controller for composing at least one message in a preferred manner on a display, the at least one message including message data and at least one video filmlet; a first data transmitter for transmitting message based data to a first network; a second data transmitter for transmitting the at least one video filmlet to a server on a second network; and a platform to support the composition of the at least one message on the display, and to support a data sync protocol on the second network. The communications apparatus may also include data storage for storing the at least one video filmlet, the at least one video filmlet being either created at a time of composing the message or pre-recorded.

Preferably, the first network may be a telecommunications network and the second network may be the internet. The telecommunications network may be selected from a form such as, for example, GSM, GPRS, CDMA, HSDPA, and EDGE.

The at least one video filmlet may be transmitted and stored on the server in accordance to sender identity when the at least one video filmlet is not available on the server, and when the communications apparatus is connected to the second network. The at least one message may preferably be composed in the manner like, for example, the at least one video filmlet incorporated amongst the SMS based data, the at least one video filmlet being a background for the SMS based data or a combination of the aforementioned.

In a third aspect, there is provided a method for communications involving at least one text message. The method includes a sender apparatus transmitting at least one message, the at least one message including message data and at least one video filmlet; transmitting the message data over a first network and the at least one video filmlet to a server on a second network; and a recipient apparatus receiving the at least one message, the at least one message being combined and generated from the message data received from the first network and the at least one video filmlet received from the server. Advantageously, the at least one message may be generated in a manner as composed by a sender of the at least one message. It is preferable that the sender and recipient apparatus are able to support a data sync protocol on the second network.

The first network may be a telecommunications network and the second network may be the internet. The telecommunications network may be of a form such as, for example, GSM, GPRS, CDMA, HSDPA, or EDGE.

It is preferable that the recipient apparatus may include data storage for storing the at least one video filmlet from the server. The at least one video filmlet may be obtained solely from the data storage on the recipient apparatus when the at least one video filmlet is stored in the data storage on the recipient apparatus.

The at least one message may be generated without the at least one video filmlet when the at least one video filmlet is not stored in the data storage on the recipient apparatus and the on the recipient apparatus is not connected to the second network. Preferably, the at least one video filmlet may be stored on the server in accordance to sender identity. Advantageously, the at least one video filmlet stored on the server for a particular sender is received from the server when the recipient apparatus is connected to the second network, the particular sender being a contact in a recipient's contact list.

The sender apparatus may include storage for storing the at least one video filmlet, the at least one video filmlet being either created at a time of composing the message or pre-recorded. Advantageously, the at least one video filmlet is transmitted and stored on the server in accordance to sender identity when the at least one video filmlet is not available on the server and when the communications apparatus is connected to the second network.

The at least one message may be composed in the manner such as, for example, the at least one video filmlet incorporated amongst the message data, the at least one video filmlet being a background for the message data or a combination of the aforementioned.

DESCRIPTION OF DRAWINGS

In order that the present invention may be fully understood and readily put into practical effect, there shall now be described by way of non-limitative example only preferred embodiments of the present invention, the description being with reference to the accompanying illustrative drawings.

DESCRIPTION OF PREFERRED EMBODIMENTS

Figure 1:
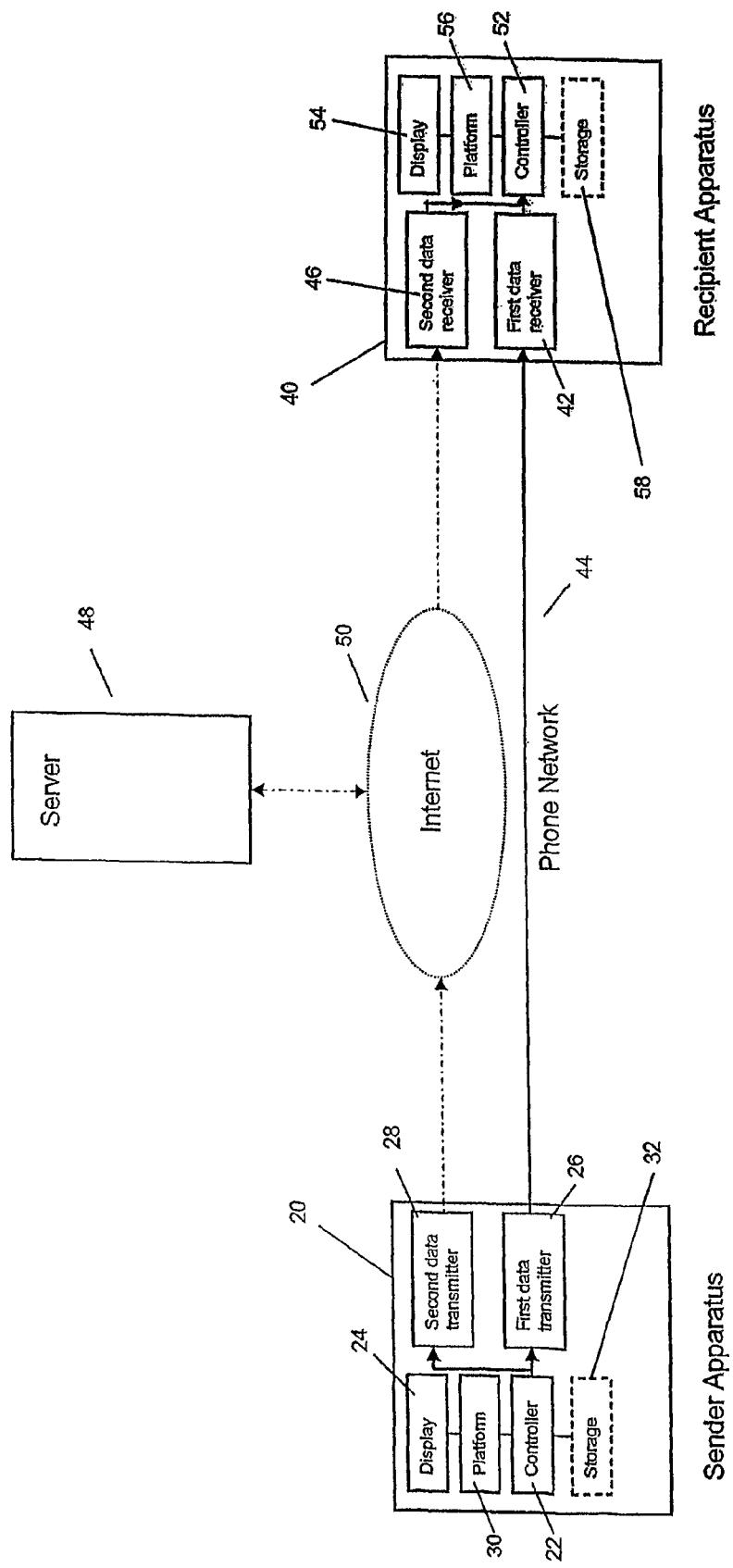
FIG. 1 shows an overview of apparatus of the present invention when in use.

Referring to FIG. 1, there is shown an overview of a sender apparatus 20 and a recipient apparatus 40 when both are in use for text messaging communication purposes as per a preferred embodiment. It should be noted that the sender apparatus 20 and the recipient apparatus 40 may be identical devices, and are preferably portable handheld devices.

The recipient apparatus 40 which is able to receive at least one text message includes a first data receiver 42 for receiving data from a first network 44. The first network 44 may be a communications channel. The first network 44 may enable a network link between the recipient apparatus 40 and the sender apparatus 20. One example of the first network 44 is a telecommunications network such as, for example, GSM, GPRS, CDMA, HSDPA, EDGE and the like. When the first network 44 is the communications network, data received over the first network may be of short message service (SMS) based data. The recipient apparatus 40 also includes a second data receiver 46 for receiving at least one video filmlet from either a server 48 on a second network 50, or directly from the sender apparatus 20. The second network 50 may be a data channel. An example of the second network 50 is the internet. The second network 50 may also be viewed alternatively as a data synchronization channel which operates using pre-defined protocols.

A controller 52 in the recipient apparatus 40 may be for combining the message data and at least one pointer to the at least one video filmlet into at least one message for generation on a display 54. The at least one pointer refers to text associated with a video filmlet in a video filmlet database index. The pointer may be in the form of either a string of text or an active hyperlink. The following list shows some non-limiting examples of how the pointer may be represented as a string of text in the at least one message:

{190108;2300;00456}, where 191008 represents date, 2300 represents time and 00456 represents an arbitrary number.

[00456@191008@2300], where 00456 represents an arbitrary number, 191008 represents date and 2300 represents time.

<ABCXX;191008;2300>, where ABCXX represents an originating device ID, 191008 represents date and 2300 represents time.

The aforementioned examples of the pointer may appear like gibberish on the recipient apparatus 40 in instances when the video filmlet is not correctly displayed in a text message.

Figure 3:
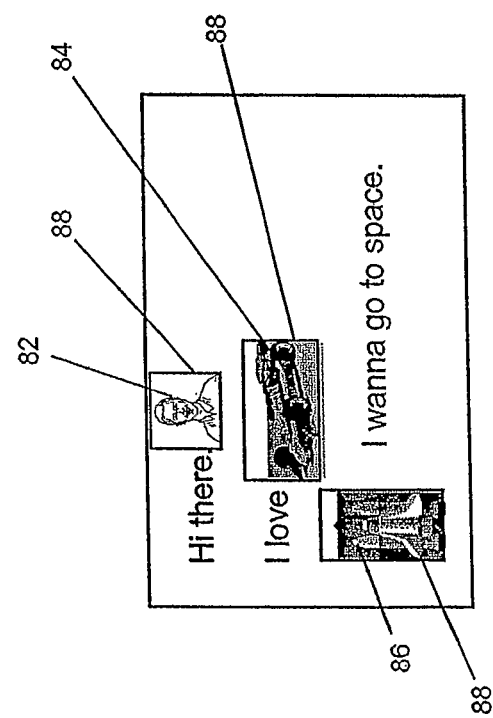
FIG. 3 shows an example of a text message generated by the apparatus and method of the present invention.

In an alternative embodiment, the video filmlet may be associated with either a particular word or a particular phrase such that the video filmlet appears on the recipient apparatus 40 replacing either the particular word or the particular phrase. During instances when the video filmlet is unable to be correctly displayed in the text message, the particular word or the particular phrase appears instead. This is depicted in FIG. 3, where a second line "I love racing cars" is expressed in the manner as shown. Further details relating to FIG. 3 are found in a later portion of the description.

The at least one video filmlet may not be directly combined into the at least one message as the recipient apparatus 40 may not be able to properly process and display the at least one video filmlet. A platform 56 to support the generation of the at least one message on the display 54 may also be incorporated into the recipient apparatus 40. The platform 56 may preferably also support a data sync protocol on the second network 50. It is preferable that the at least one message which is generated on the display 54 is presented in a manner as composed by a sender of the at least one message using the sender apparatus 20. However, in instances where the recipient apparatus 40 is either not able to properly process and display the at least one video filmlet, or where the recipient apparatus 40 is not connected to/unable to sync with the second network 50, the at least one message may be presented in a manner where either the string of text or the active hyperlink forms part of the message. The depiction of the video filmlet as shown in FIG. 3 may also be an alternative manner of presenting such video filmlets. The recipient is consequently able to know that the at least one message includes at least one video filmlet, and is able to access the at least one video filmlet by either selection of the active hyperlink or by obtaining the at least one video filmlet on the server 48 when the recipient apparatus 40 is connected to the second network 50.

An example of the at least one message 80 is shown in FIG. 3. Each message may be restricted to one hundred and sixty alphanumeric characters as per standard SMS message sizes. It should be noted that video filmlets 82, 84 and 86 as shown in FIG. 3 are represented using two dimensional still images due to an inability to express them in their actual form in this specification. A first video filmlet 82 shows a sender sending a greeting by saying something like "Hello" and may be waving his hand(s). A second video filmlet 84 shows a scene of a moving racing car while a third filmlet 86 shows a scene of a space shuttle during a take-off sequence. The second video filmlet 84 appears instead of the phrase "racing cars" because the second video filmlet 84 is associated with the phrase "racing cars". The scenes of the video filmlets 82, 84 and 86 may be repeated cyclically, and are constrained within a screening window 88 as shown. The at least one message 80 may be received in the manner where, for example, the at least one video filmlet is incorporated amongst the message data (as shown in FIG. 3), the at least one video filmlet acts as a background for the message data or a combination of the aforementioned. The at least one video filmlet may be in the form of a proprietary format or in typical video formats such as, for example, mp4, avi, divX and so forth. The at least one video filmlet may be the background for the message when the at least one video filmlet is defined by the sender to be the background.

The video filmlets 82, 84, 86 are arranged within the message 80, but preferably do not utilize any of the one hundred and sixty alphanumeric character slots allocated for standard SMS messages unless the word/phrase that the video filmlets 82, 84, 86 are associated with appears instead because of the non-appearance of the video filmlets 82, 84, 86. Alternatively, the pointers associated with specific video filmlets are incorporated in the message 80, and these pointers take up some slots from among the one hundred and sixty available alphanumeric character slots. The specific video filmlet may be stored in a data storage 58 of the recipient apparatus 40, the pointer being processed by the controller 52 of the recipient apparatus 40 with the controller 52 generating the message 80 in a manner as composed by a sender of the at least one message using the sender apparatus 20. The locations of the pointers in the message 80 indicate where the video filmlets are incorporated in the message 80. The data storage 58 may either be incorporated in the recipient apparatus 40 or be in a removable form like memory cards.

When the pointer is associated with a video filmlet which is not stored in the data storage 58, it may mean that the recipient apparatus 40 is not connected to the second network 50 such that the video filmlet was not received by the recipient apparatus 40 as no data sync-ing with the server 48 has occurred. In such an instance, the at least one message is generated without the at least one video filmlet. However, if the message is not deleted from the recipient apparatus 40, once the recipient apparatus 40 connects to the second network 50, the at least one video filmlet would be drawn from the server 48 (which may be a personal online storage facility) and received by the recipient apparatus 40 as data sync-ing with the server 48 occurs, and the message would appear in a manner as composed by a sender of the at least one message using the sender apparatus 20 when the message is viewed again on the recipient apparatus 40 subsequent to connection of the recipient apparatus 40 to the second network 50.

The at least one video filmlet is stored on the server 48 in accordance to sender identity. Whenever the recipient apparatus 40 is connected to the second network 50, the recipient apparatus 40 draws the at least one video filmlet from the server 48 (sync-ing) of contacts in a contact list in the recipient apparatus 40. This allows the video filmlets stored in the data storage 58 to be continually updated for the contacts in the contact list of the recipient apparatus 40.

In FIG. 1, there is also disclosed the sender apparatus 20, the sender apparatus 20 being used for transmitting at least one text message. The sender apparatus 20 includes a controller 22 for composing at least one message in a preferred manner on a display 24. A first data transmitter 26 in the sender apparatus 20 may be used for transmitting the message data to the first network 44. The sender apparatus 20 also includes a second data transmitter 28 for transmitting the at least one video filmlet to either the server 48, or directly to the recipient apparatus 40 on the second network 50. The first network 44 may be a communications channel. The first network 44 may enable a network link between the recipient apparatus 40 and the sender apparatus 20. An example of the first network 44 may be a telecommunications network such as, for example, GSM, GPRS, CDMA, HSDPA, EDGE and the like. The second network 50 may be a data channel. The second network 50 may be the internet. The second network 50 may also be viewed alternatively as a data synchronization channel. The sender apparatus 20 may also include a platform 30 to support the composition of the at least one message on the display 24.

The at least one video filmlet may be either created at a time of composing the message, or pre-recorded. The sender apparatus 20 may also further include data storage 32 for storing the at least one video filmlet. The data storage 32 may either be incorporated in the sender apparatus 20 or be in a removable form like memory cards.

An example of the at least one message 80 is shown in FIG. 3. Each message may be restricted to one hundred and sixty alphanumeric characters as per standard SMS messages. It should be noted that video filmlets 82, 84 and 86 as shown in FIG. 3 are represented using two dimensional still images due to an inability to express them in their actual form in this specification. A first video filmlet 82 shows a sender sending a greeting by saying something like "Hello" and may be waving his hand(s). A second video filmlet 84 shows a scene of a moving racing car while a third filmlet 86 shows a scene of a space shuttle during a take-off sequence. The second video filmlet 84 appears instead of the phrase "racing cars" because the second video filmlet 84 is associated with the phrase "racing cars". The scenes of the video filmlets 82, 84 and 86 may be repeated cyclically, and are framed within a screening window 88 as shown. The at least one message 80 may be composed in the manner where, for example, the at least one video filmlet is incorporated amongst the message data (as shown in FIG. 3), the at least one video filmlet acts as a background for the message data or a combination of the aforementioned. The at least one video filmlet may be in the form of a proprietary format or in typical video formats such as, for example, mp4, avi, divX and so forth. The at least one video filmlet may be the background for the message when the at least one video filmlet is defined by the sender to be the background.

The video filmlets 82, 84, 86 are arranged within the message 80, but do not utilize any of the one hundred and sixty alphanumeric character slots allocated for standard SMS messages unless the word/phrase that the video filmlets 82, 84, 86 are associated with appears instead because of the non-appearance of the video filmlets 82, 84, 86. When composing the message 80, the sender only needs to "insert video filmlet" or input associated words/phrases. There would be no necessity for the sender to manually incorporate pointers associated with specific video filmlets into the message 80 when composing the message 80. These pointers typically take up some slots from among the one hundred and sixty allocated alphanumeric character slots per text message. The pointer is associated to a specific video filmlet which is stored in the data storage 32 of the sender apparatus 20, the pointer being processed by the controller 22 of the sender apparatus 20 and the controller 22 arranges the message 80 in a manner as composed by the sender. The locations of the pointers in the message 80 indicate where the video filmlets are incorporated in the message 80. The sender apparatus 20 does not transmit a video filmlet to the server 48 when it is connected to the second network 50 if either the server 48 or the recipient apparatus 40 already includes the video filmlet. The at least one video filmlet may be stored on the server 48 in accordance to sender identity. When the sender apparatus 20 is connected to the second network 50, the sender apparatus 20 transmits the at least one video filmlet from the data storage 32 (sync-ing) which either does not reside on the server 48 (which may be a personal online storage facility) or the data storage 58 of the recipient apparatus 40. This allows the video filmlets stored in the server 48 to be continually updated for each sender.

Figure 2:
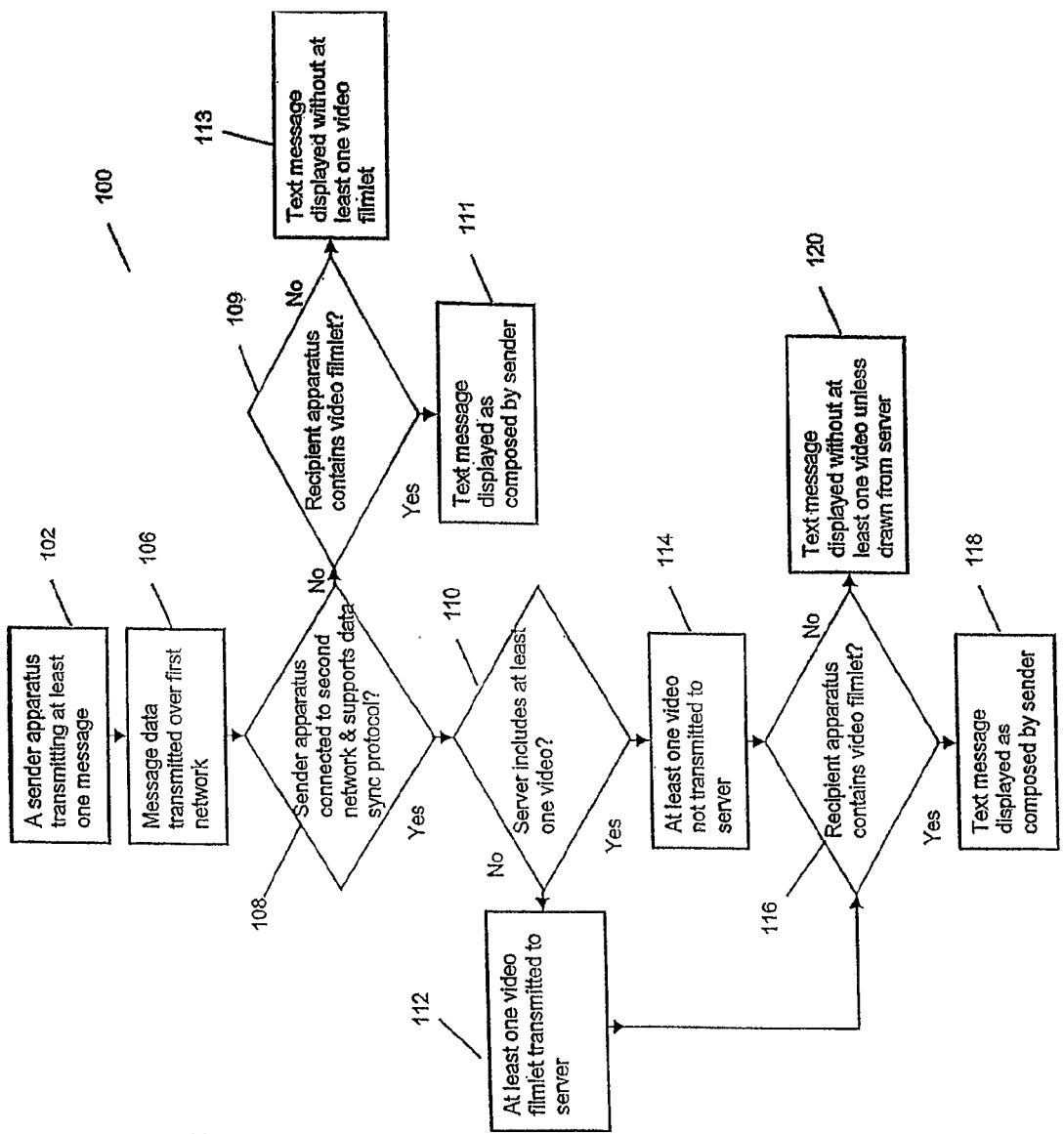
FIG. 2 shows a process flow of a method of the present invention.

Referring to FIG. 2, there is shown another aspect of the present invention. A method 100 for communications involving at least one text message between a sender apparatus and a recipient apparatus is shown. The method 100 includes the sender apparatus transmitting at least one message 102. The at least one message may be in the manner where, for example, the at least one video filmlet is incorporated amongst the message data (as shown in FIG. 3), the at least one video filmlet acts as a background for the message data or a combination of the aforementioned. The at least one video filmlet may be in the form of a proprietary format or in typical video formats such as, for example, mp4, avi, divX and so forth. An example of the at least one message is depicted in FIG. 3 as described in an earlier portion of the description.

The message data may be transmitted over a first network 106 and the at least one video filmlet may be transmitted to a server on a second network. The first network may be a communications channel and may enable a network link between the recipient apparatus and the sender apparatus. The first network may be a telecommunications network such as, for example, GSM, GPRS, CDMA, HSDPA, EDGE and the like. The second network may be a data channel. The second network may be the internet. The second network may also be viewed alternatively as a data synchronization channel.

It is determined whether the sender apparatus is connected to the second network and able to support a data synchronization protocol 108. If yes, the sender apparatus checks whether the server includes the at least one video filmlet 110. If no, it is determined whether the recipient apparatus contains the at least one video filmlet 109. The text message is displayed on the recipient apparatus in a manner as composed by the sender (combination of the message data received from the first network and the at least one video filmlet) if the recipient apparatus contains the at least one video filmlet 111. Correspondingly, the text message is displayed on the recipient apparatus without the at least one video filmlet if the recipient apparatus does not contain the at least one video filmlet 113. When the text message does not show the at least one video filmlet, at least one pointer is seen in the message instead.

When the sender apparatus checks that the server does not include the at least one video filmlet, the sender apparatus transmits the at least one video filmlet to the server 112 when the at least one video filmlet is not found on the server. When the sender apparatus checks that the server includes the at least one video filmlet, the sender apparatus does not transmit the at least one video filmlet to the server 114.

When the sender apparatus does not transmit the at least one video filmlet to the server 114, it is determined whether the recipient apparatus contains the at least one video filmlet 116. The text message is displayed on the recipient apparatus in a manner as composed by the sender (combination of the message data received from the first network and the at least one video filmlet received from the server) if the recipient apparatus contains the at least one video filmlet 118. The text message is displayed on the recipient apparatus without the at least one video filmlet unless the recipient apparatus draws (sync-ing) the at least one video filmlet from the server 120 (if and when the recipient apparatus is connected to the second network and if the text message still resides on the recipient apparatus). When the text message does not show the at least one video filmlet, at least one pointer is seen in the message instead.

After the sender apparatus transmits the at least one video filmlet to the server 112, it is determined whether the recipient apparatus contains the at least one video filmlet 116. The text message is displayed on the recipient apparatus in a manner as composed by the sender (combination of the message data received from the first network and the at least one video filmlet received from the server) if the recipient apparatus contains the at least one video filmlet 118.

The sender and recipient apparatus as described in an earlier portion of the description may be employed in the method 100.

Whilst there has been described in the foregoing description preferred embodiments of the present invention, it will be understood by those skilled in the technology concerned that many variations or modifications in details of design or construction may be made without departing from the present invention.

The invention claimed is:

1. A communications apparatus used for receiving at least one text message, the apparatus including:
    a first data receiver for receiving message data from a first network;
    a second data receiver for receiving at least one video filmlet from a server on a second network;
    a controller for combining the message data and the at least one video filmlet, when received, into at least one message for generation on a display, and
    a platform to support the generation of the at least one message on the display, and to support a data sync protocol on the second network,
    wherein in the absence of data sync with the server on the second network, the video filmlet is not received by the second data receiver and the at least one message is initially generated without the at least one video filmlet, and
    wherein if the initially generated at least one message is retained in the communications apparatus, at least one video flimlet is subsequently drawn from the server and received by the second data receiver when data sync with the server on the second network is subsequently established such that the initially generated at least one message is subsequently based on a combination of message data and at least one video filmlet.

2. The communications apparatus of claim 1, wherein the first network is a telecommunications network and the second network is the internet.

3. The communications apparatus of claim 1, further including data storage for storing the at least one video filmlet from the server.

4. The communications apparatus of claim 3, wherein the at least one video filmlet is obtained solely from the data storage when the at least one video filmlet is stored in the data storage.

5. The communications apparatus of claim 4, wherein the at least one message is generated without the at least one video filmlet when the at least one video filmlet is not stored in the data storage and the communications apparatus is not connected to the second network.

6. The communications apparatus of claim 1, wherein the at least one video filmlet is stored on the server in accordance to sender identity.

7. The communications apparatus of claim 6, wherein the at least one video filmlet stored on the server for a particular sender is received from the server when the communications apparatus is connected to the second network, the particular sender being a contact in a recipient's contact list.

8. The communications apparatus of claim 1, wherein the at least one message is received in the manner selected from a group consisting of: the at least one video filmlet incorporated amongst the message data, the at least one video filmlet being a background for the message data and a combination of the aforementioned.

9. The communications apparatus of claim 1, wherein the at least one text message is being generated using a sender apparatus, the sender apparatus including:
a controller for composing the at least one message in a preferred manner on a second display, the at least one message including the message data and the at least one video filmlet; a first data transmitter for transmitting the message data to the first network;
a second data transmitter for transmitting the at least one video filmlet to the server on the second network; and
a platform to support the composition of the at least one message on the second display, and to support the data sync protocol on the second network.

10. The communications apparatus of claim 9, wherein the at least one message is composed in the manner selected from a group consisting of: the at least one video filmlet incorporated amongst the Short Message Service (SMS) based data, the at least one video filmlet being a background for the SMS based data and a combination of the aforementioned.

11. A method for communications involving at least one text message, the method including:
a sender apparatus transmitting at least one message, the at least one message including at least one of message data and at least one video filmlet;
transmitting the message data over a first network and the at least one video filmlet to a server on a second network; and
a recipient apparatus receiving the at least one message, the at least one message being combined and generated from the message data received from the first network and the at least one video filmlet received from the server,
wherein in the absence of data sync with the server on the second network, the video filmlet is not received by the recipient apparatus and the at least one message is initially generated at the sender apparatus without the at least one video filmlet, and wherein if the initially generated at least one message is retained in the recipient apparatus, at least one video flimlet is subsequently drawn from the server and received by the recipient apparatus when data sync with the server on the second network is subsequently established such that the initially generated at least one message is subsequently based on a combination of message data and at least one video filmlet.

12. The method of claim 11, wherein the first network is a telecommunications network and the second network is the internet.

13. The method of claim 11, wherein the recipient apparatus includes data storage for storing the at least one video filmlet from the server.

14. The method of claim 13, wherein the at least one video filmlet is obtained solely from the data storage on the recipient apparatus when the at least one video filmlet is stored in the data storage on the recipient apparatus.

15. The method of claim 13, wherein the at least one message is generated without the at least one video filmlet when the at least one video filmlet is not stored in the data storage on the recipient apparatus and the on the recipient apparatus is not connected to the second network.

16. The method of claim 11, wherein the at least one video filmlet is stored on the server in accordance to sender identity.

17. The method of claim 16, wherein the at least one video filmlet stored on the server for a particular sender is received from the server when the recipient apparatus is connected to the second network, the particular sender being a contact in a recipient's contact list.

18. The method of claim 11, further including data storage on the sender apparatus for storing the at least one video filmlet, the at least one video filmlet being either created at a time of composing the message or pre-recorded.

19. The method of claim 11, wherein the at least one video filmlet is transmitted and stored on the server in accordance to sender identity when the at least one video filmlet is not available on the server and when the sender apparatus is connected to the second network.

20. The method of claim 11, wherein the at least one message is composed in the manner selected from a group consisting of: the at least one video filmlet incorporated amongst the message data, the at least one video filmlet being a background for the message data and a combination of the aforementioned.

21. The method of claim 11, wherein the sender and recipient apparatus are able to support a data sync protocol on the second network.

22. A sender apparatus usable for transmitting at least one text message to a recipient apparatus, the sender apparatus including:
a controller for composing at least one message in a preferred manner on a display, the at least one message including message data and at least one video filmlet;
a first data transmitter for transmitting message based data to a first network;
a second data transmitter for transmitting the at least one video filmlet to a server on a second network; and
a platform to support the composition of the at least one message on the display, and to support a data sync protocol on the second network,
wherein in the absence of data sync of the recipient apparatus with the server on the second network, the video filmlet is not received by the recipient apparatus and the at least one message is initially generated on the recipient apparatus without the at least one video filmlet, and wherein if the initially generated at least one message is retained in the recipient apparatus, at least one video flimlet is subsequently drawn from the server and received by the recipient apparatus when data sync between the recipient apparatus and the server on the second network is subsequently established such that the initially generated at least one message is subsequently based on a combination of message data and at least one video filmlet.

* * * * *